United States Patent [19]
Izumi

[11] Patent Number: 6,072,754
[45] Date of Patent: Jun. 6, 2000

[54] MAGNETO-OPTICAL MEDIUM AND REPRODUCING DEVICE FOR THE SAME

[75] Inventor: Haruhiko Izumi, Kawasaki, Japan

[73] Assignee: Fujitsu Limited, Kawasaki, Japan

[21] Appl. No.: 09/249,843

[22] Filed: Feb. 12, 1999

Related U.S. Application Data

[62] Division of application No. 08/820,440, Mar. 21, 1997, which is a continuation of application No. 08/294,920, Aug. 24, 1994, abandoned.

[30] Foreign Application Priority Data

Dec. 21, 1993 [JP] Japan ..................................... 5-322693

[51] Int. Cl.[7] .............................. G11B 11/00; G11B 7/24
[52] U.S. Cl. ............................... 369/13; 369/54; 369/48; 369/275.3
[58] Field of Search ................................... 369/13, 275.3, 369/275.4, 275.2, 47, 48, 58, 54, 124, 44.35, 44.31, 44.34, 44.26, 59, 116, 32

[56] References Cited

U.S. PATENT DOCUMENTS

| | | | |
|---|---|---|---|
| 5,040,165 | 8/1991 | Taii et al. | 369/275.4 |
| 5,218,599 | 6/1993 | Tsuyoshi et al. | 369/275.1 |
| 5,235,590 | 8/1993 | Taguchi et al. | 369/124 |
| 5,327,411 | 7/1994 | Iwasa et al. | 369/59 |
| 5,371,722 | 12/1994 | Yoshimura et al. | 369/13 |
| 5,414,692 | 5/1995 | Aoki | 369/275.3 |
| 5,448,552 | 9/1995 | Onagi | 369/275.4 |
| 5,459,711 | 10/1995 | Ohta et al. | 369/275.4 |
| 5,463,606 | 10/1995 | Kaneko et al. | 369/59 |
| 5,524,103 | 6/1996 | Shimizu et al. | 369/59 |
| 5,535,187 | 7/1996 | Melas et al. | 369/59 |
| 5,546,364 | 8/1996 | Fuji et al. | 369/13 |
| 5,602,823 | 2/1997 | Aoki et al. | 369/275.3 |
| 5,768,219 | 6/1998 | Yamamoto et al. | 369/13 |

OTHER PUBLICATIONS

Kaneko et al., "Multilayered Magneto–Optical Disks for Magnetically Induced Superresolution," Jpn. J. Appl. Phys., vol. 31 (1992), pp. 568–575.

*Primary Examiner*—Ali Neyzari
*Attorney, Agent, or Firm*—Greer, Burns & Crain, Ltd.

[57] ABSTRACT

A magneto-optical medium and a reproducing device for the medium has, in the magneto-optical medium, a mark in a magneto-optical recording area is so formed as to correspond to one of "1" and "0" of data to be recorded, and in a pre-formatted recording area, a pit in formed so that an edge of said pit corresponds to one of "1" and "0" of the data to be recorded. Therefore, when the magneto-optical recording area and the pre-formatted recording area have substantially the same linear recording density, only one pit exists in the spot area of a reproducing beam. As a result, excellent characteristics can be obtained due to a super resolution effect.

2 Claims, 6 Drawing Sheets

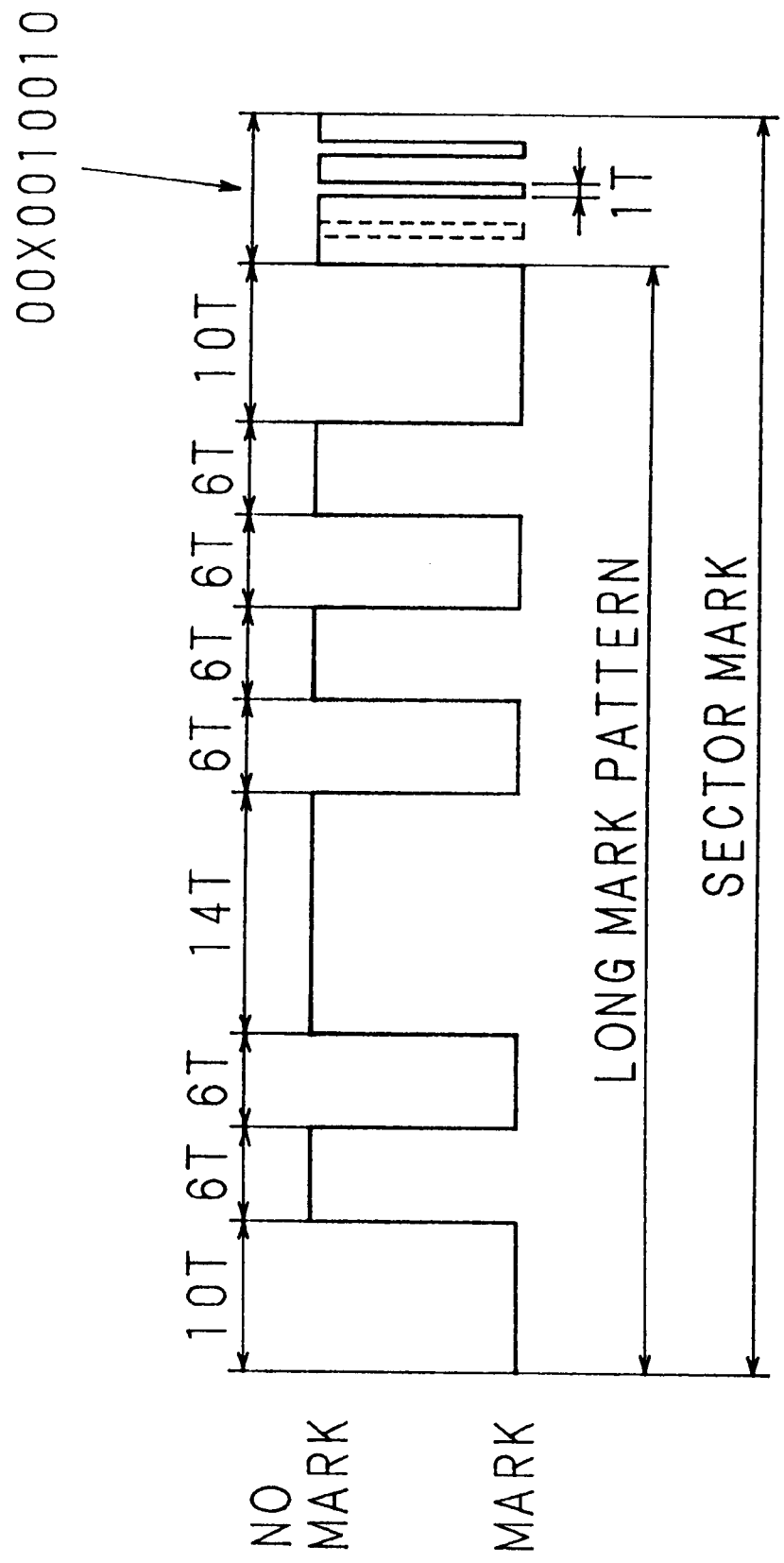

MAGNETO-OPTICAL MEDIUM AND REPRODUCING DEVICE FOR THE SAME

This is a divisional, of application Ser. No. 08/820,440, filed Mar. 12, 1997 which is a continuation of application Ser. No. 08/294,920, filed Aug. 24, 1994, now abandoned.

BACKGROUND OF THE INVENTION

1. Field of the Invention

The present invention relates to a magneto-optical medium for achieving high density recording and a reproducing device for the magneto-optical medium.

2. Description of Related Art

On an erasable magneto-optical disk, information is recorded as follows: A magneto-optical recording film is heated through irradiation with a laser beam. As a result, a mark indicating the direction of magnetization is formed on the heated portion so that the direction corresponds to that of the external magnetic field in accordance with the information to be recorded. In reproducing the recorded information, the track of such marks is irradiated with a laser beam so as to utilize the Kerr effect that the plane of polarization of the reflected light is rotated in accordance with the direction of magnetization. In such a conventional magneto-optical recording/reproducing system, the entire spot area of the laser beam on the magneto-optical disk is used as an area for detecting a signal to be reproduced. Therefore, the reproducible linear recording density is determined by the spot diameter of the irradiating laser beam.

A magneto-optical disk has been regarded as a leading memory for storing data increasing in the recent rapidly developing multimedia, and has been desired to have a larger storage capacity. The reproducible linear recording density, however, is determined by the spot diameter of the laser beam as described above, and the spot diameter is limited by optical problems of a laser beam source and the like. Thus, it was difficult to achieve high density recording.

In order to achieve high density recording, a magnetically induced super resolution medium (hereinafter referred to as the MSR medium) and the recording/reproducing system for the MSR medium are proposed. In this recording/reproducing system, a disk bearing a lamination of a plurality of magnetic films respectively having different magnetic characteristics depending upon temperature is used to read data from a part of the spot area of the laser beam. Therefore, even when a mark is smaller than the area determined by the spot diameter of the laser beam, the data can be steadily read. The MSR medium and the recording/reproducing system for the MSR medium will now be described.

FIG. 1 shows the structure of the MSR medium and the positional relationship between a mark and the spot area of the laser beam on the recording track disclosed in Jpn. J. Appl. Phys. Vol. 31 (1992) (pp. 568–575 Part 1, No. 2B, February 1992). A recording film 1 formed on a transparent substrate (not shown) includes three layers, i.e., a reproducing layer 2, a switching layer 3 and a recording layer 4 in this order from the substrate. Data is recorded on the recording layer 4 in accordance with the direction of magnetization, and marks 6 are formed on a recording track 5 with a narrower pitch therebetween than the spot diameter of a laser beam to be used for irradiation. With regard to a magneto-optical disk, the power of a laser beam for recording can be controlled so that an area to be heated up to a temperature over a Curie temperature (Tc) is made smaller than the spot. Therefore, it is not difficult to form small marks.

The reproducing operation by using the MSR medium is as follows: At room temperature, the direction of magnetization in the reproducing layer 2 coincides with that in the recording layer 4 due to the exchange coupling force therebetween through the switching layer 3. In an area where the temperature is raised over the Tc of the switching layer 3 by the laser beam irradiation for reproducing (herein referred to as a high temperature area), however, the exchange coupling force with the recording layer 4 is lost. Therefore, the direction of magnetization in such a high temperature area in the reproducing layer 2 coincides with the direction of externally applied reproducing magnetic field (Hr). As a result, the high temperature area works as a mask for masking the marks therein, and data are read from a low temperature area (i.e., an area where the temperature is not over the Tc) on the recording layer 4. In this manner, the marks can be read from an area smaller than the spot diameter of the laser beam for reproducing, and the obtained resolution is substantially as high as that obtained when a laser beam for reproducing has a smaller light spot.

FIG. 2 is a graph showing the reproducing signal characteristics in the MSR medium and a conventional magneto-optical medium. The MSR medium exhibits excellent characteristics (C/N) even when the linear recording density is increased and a mark is smaller.

The above-mentioned method, that is, the method in which a high temperature area in the laser spot area is masked and a mark in a low temperature area is read, is designated as a front aperture detection (FAD) method. Another method, in which a low temperature area in the laser spot area is masked and a mark in a high temperature area is read, is known as a rear aperture detection (RAD) method, which also attains high resolution reproducing.

The RAD can he realized by a magneto-optical disk including two layers: a reproducing layer and a recording layer. An initializing magnetic field is applied just before the irradiation of the reproducing laser beam is focused upon a ma to be read causing the direction of magnetization in the reproducing layer to coincide with that of the initializing magnetic field. At this point, the marks in the recording layer remain unchanged. Just after the application of the initializing magnetic field, the reproducing layer works as a mask for masking the data on the recording layer. Subsequently, the irradiation of the reproducing laser beam raises the temperature of the reproducing layer working as the mask at the position of the mark to be read. When the exchange coupling force between the reproducing layer and the recording layer becomes larger than the coercive force of the reproducing layer as a result of the temperature rise, the direction of magnetization in the recording layer is transferred. In other words, the reproducing layer is unmasked at a high temperature area, from which the mark is read.

On a magneto-optical disk, pre-formatted information such as ID signals and ROM data are recorded as well as magneto-optically recorded general information. It is preferable that a pre-formatted recording area for the pre-formatted information and a magneto-optical recording area for the general information have the same linear recording density because the data in both recording areas can be reproduced by using a common synchronous clock generator and a common data discriminator. On the pre-formatted recording area, however, an irregularity (such as a pit) is formed (for generating an emboss signal) through a press process. Therefore, the masking effect as in the MSR medium cannot be obtained in reproducing the data in the pre-formatted recording area. Thus, in prior art devices, it was a waste of disk space to allow these recording areas to have the same linear recording density.

Japanese Patent Application Laid-Open No. 4-259941 (1992) discloses a method for recording sector management information in a pre-formatted recording area at a lower linear recording density than that for recording general information. In such a case, the sector management information can be reproduced although the super resolution effect cannot be attained.

When this method is used for a partial ROM disk, in which data of several megabytes to several tens megabytes is previously recorded as ROM data and the magneto-optical recording area is provided as a RAM area to be freely used by a user, the ROM data area is required to be large because the linear recording density of the ROM data is low. This causes a problem because the RAM area for a user becomes extremely small.

SUMMARY OF THE INVENTION

The present invention has been devised to solve the above-mentioned problems, and the object thereof is to provide a magneto-optical medium (MSR medium) utilizing a super resolution effect in which a magneto-optical recording area and a pre-formatted recording area have the same linear recording density, and providing a reproducing device for the magneto-optical medium.

On the magneto-optical medium of the invention, which is an MSR medium, data is recorded in the magneto-optical recording area by a position recording a mark is formed to correspond to so that leading and trailing edges of the mark correspond to either a "1" and "0" of the data, and data is recorded in the pre-formatted area by an edge recording so that an edge of a pit may be read to correspon to one either one of "1" and "0" of the data. The magneto-optical recording area and the pre-formatted recording area have the same linear recording density.

The reproducing device of the invention is used to reproduce data from a the magneto-optical medium of the invention. The reproducing device comprises a peak detector for detecting a peak in a reproduced waveform read from the magneto-optical recording area, an edge detector for detecting an edge in a reproduced waveform read from the pre-formatted recording area, a synchronous clock generator for generating synchronous clock signals having approximately the same frequency in reproducing the data in both the magneto-optical recording area and the pre-formatted recording area, and a data discriminator used commonly to reproduce the data in the magneto-optical recording area and the pre-formatted recording area for discriminating the data based on the output of the peak detector and the edge detector. The edge detector can also detect a sector mark in a magneto-optical medium conforming to the ISO standard.

When the linear recording density is same in the magneto-optical recording area and the pre-formatted recording area, the length of the shortest pit formed by the edge recording is twice as long as the length of a mark formed by the position recording. As a result, the data in the magneto-optical recording area can be excellently reproduced owing to the super resolution effect, and the data in the pre-formatted recording area can be excellently reproduced although the super resolution effect is not used.

The above and further objects and features of the invention will more fully be apparent from the following detailed description with accompanying drawings.

BRIEF DESCRIPTION OF THE DRAWINGS

FIG. 6 shows the data pattern in a sector mark in the sector of FIG. 5.

DESCRIPTION OF THE PREFERRED EMBODIMENTS

The present invention will now be described referring to the accompanying drawings.

Figure 3:
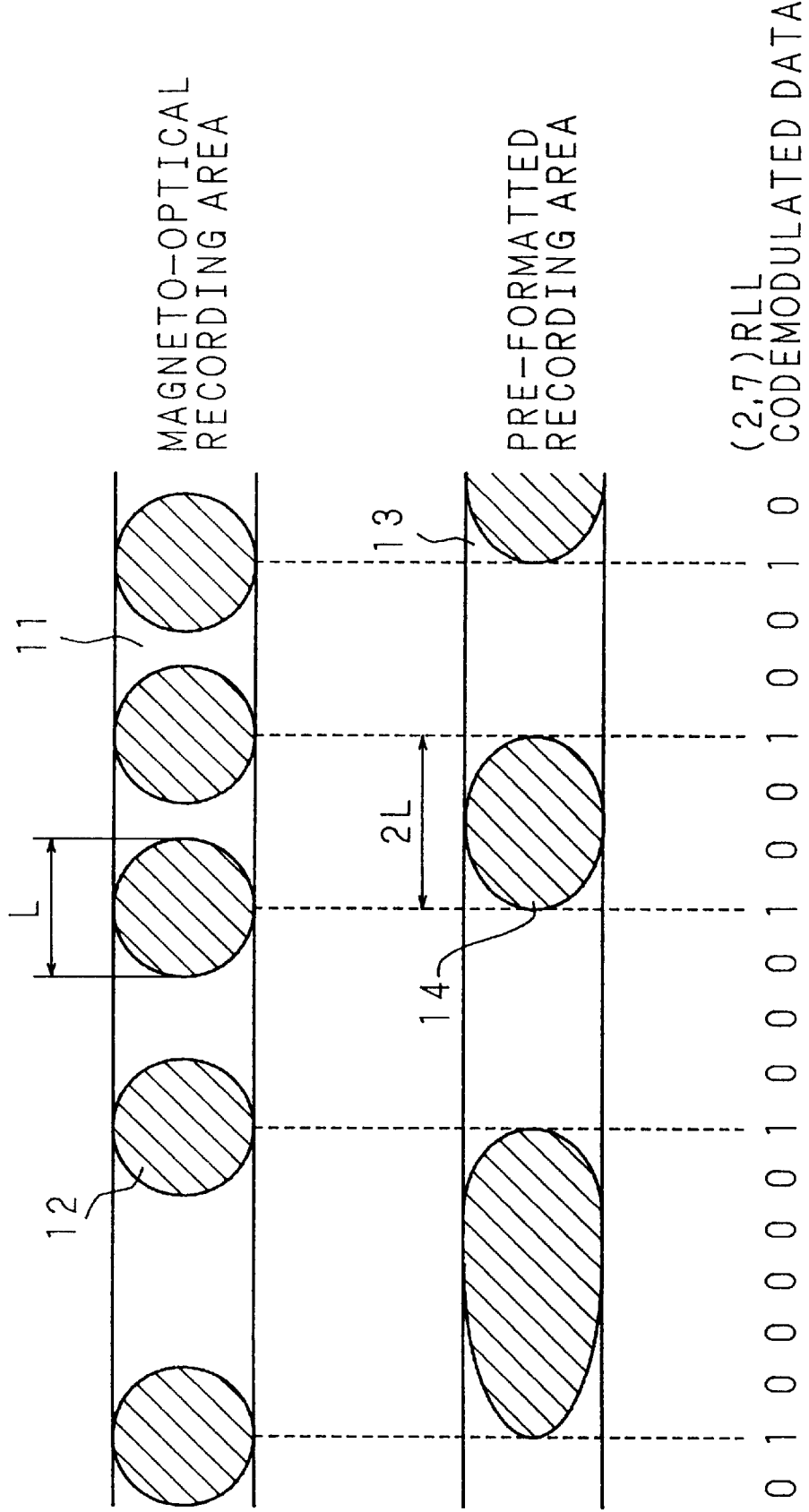
FIG. 3 shows an example of recording on a high density magneto-optical medium according to the present invention.

FIG. 3 shows an example of recording on a magneto-optical disk of this invention, in which (2,7)RLL code-modulated data is recorded in a magneto-optical recording area and a pre-formatted recording area. In a recording track 11 in the magneto-optical recording area, data is recorded so that a mark 12 corresponds to the modulated data "1" or "0". Such a recording method for making a mark correspond to data "1" or "0" is herein designated as the position recording. In a recording track 13 in the pre-formatted recording area, data is recorded so that an edge (the front or rear edge) of a pit 14 may be read to correspond the modulated data "1" or "0". Such a recording method for making the edge of a pit correspond to read data "1" or "0" is herein designated as the edge recording. The magneto-optical recording area and the pre-formatted recording area have the same linear recording density.

Figure 1:
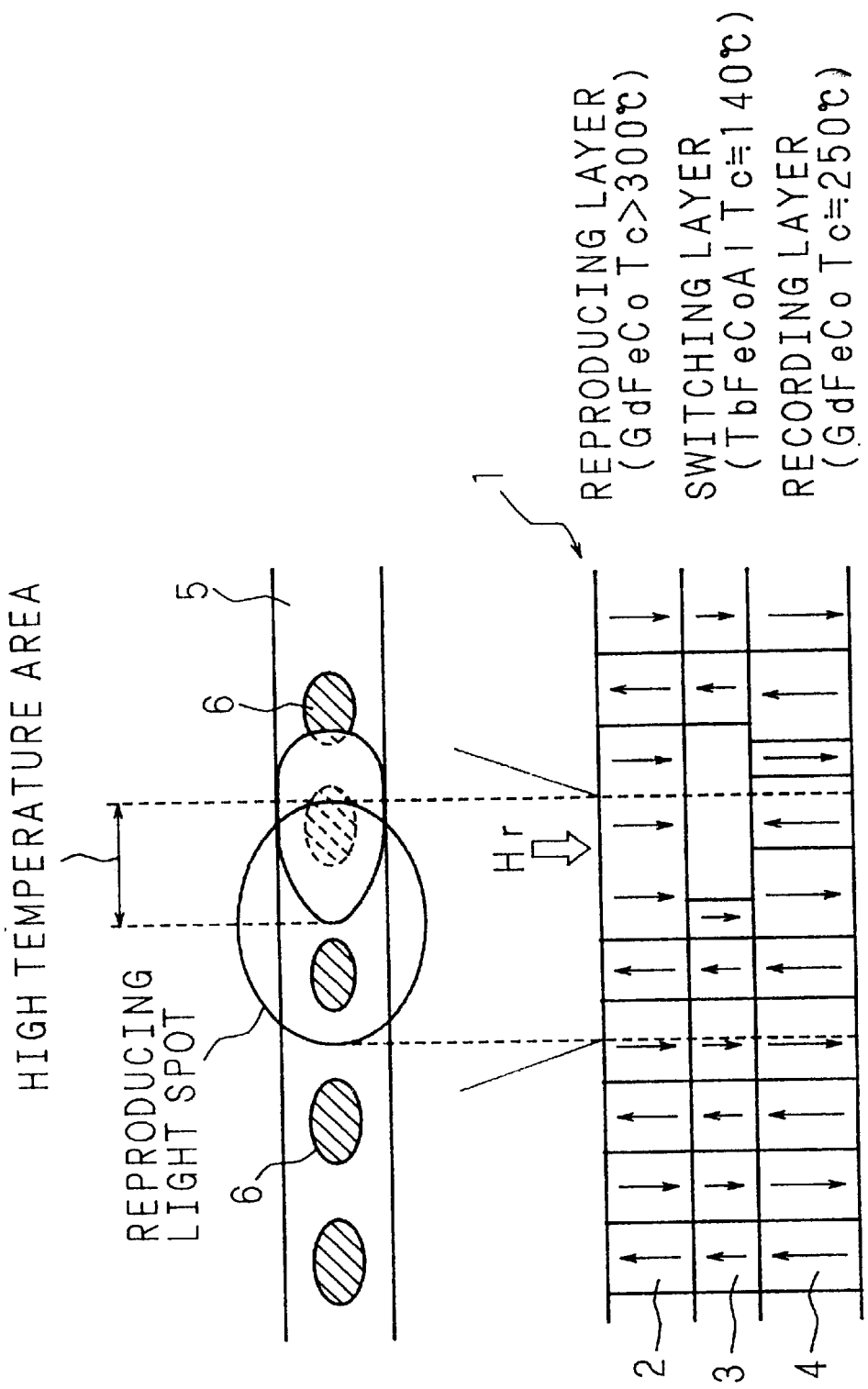
FIG. 1 shows the structure of a conventional MSR medium and the positional relationship between a mark and the spot area of a laser beam on the recording track of the MSR medium.
Figure 2:
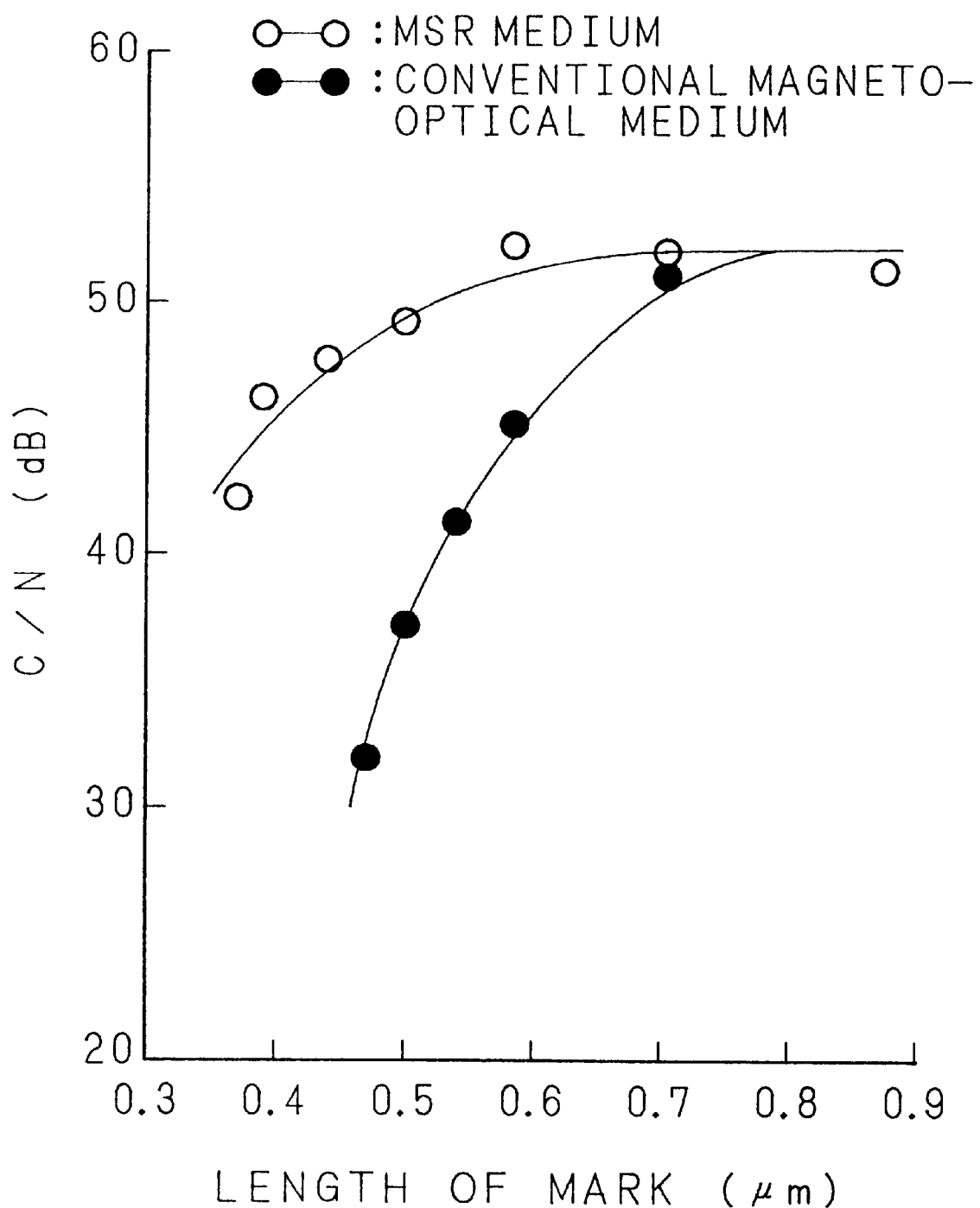
FIG. 2 is a graph showing the reproducing signal characteristics in the MSR medium of FIG. 1 and a conventional magneto-optical medium.

When the linear recording density is the same, the length of the shortest pit formed by the edge recording is twice as long as the length of a mark formed by the position recording. Therefore, when the length of the mark 12 in the magneto-optical recording area is assumed to be L, the length of the shortest pit 14 in the pre-formatted recording area is 2L. For example, when the length of the mark 12 in the magneto-optical recording area is 0.4 μm, the length of the shortest pit 14 in the pre-formatted recording area is 0.8 μm. As shown in FIG. 2, the mark length of 0.4 μm in the magneto-optical recording area exhibits excellent reproducing characteristics (C/N of more than 45 dB) due to the super resolution effect. The pit length of 0.8 μm in the pre-formatted recording area also exhibits the same excellent reproducing characteristics as in the conventional magneto-optical medium.

Figure 4:
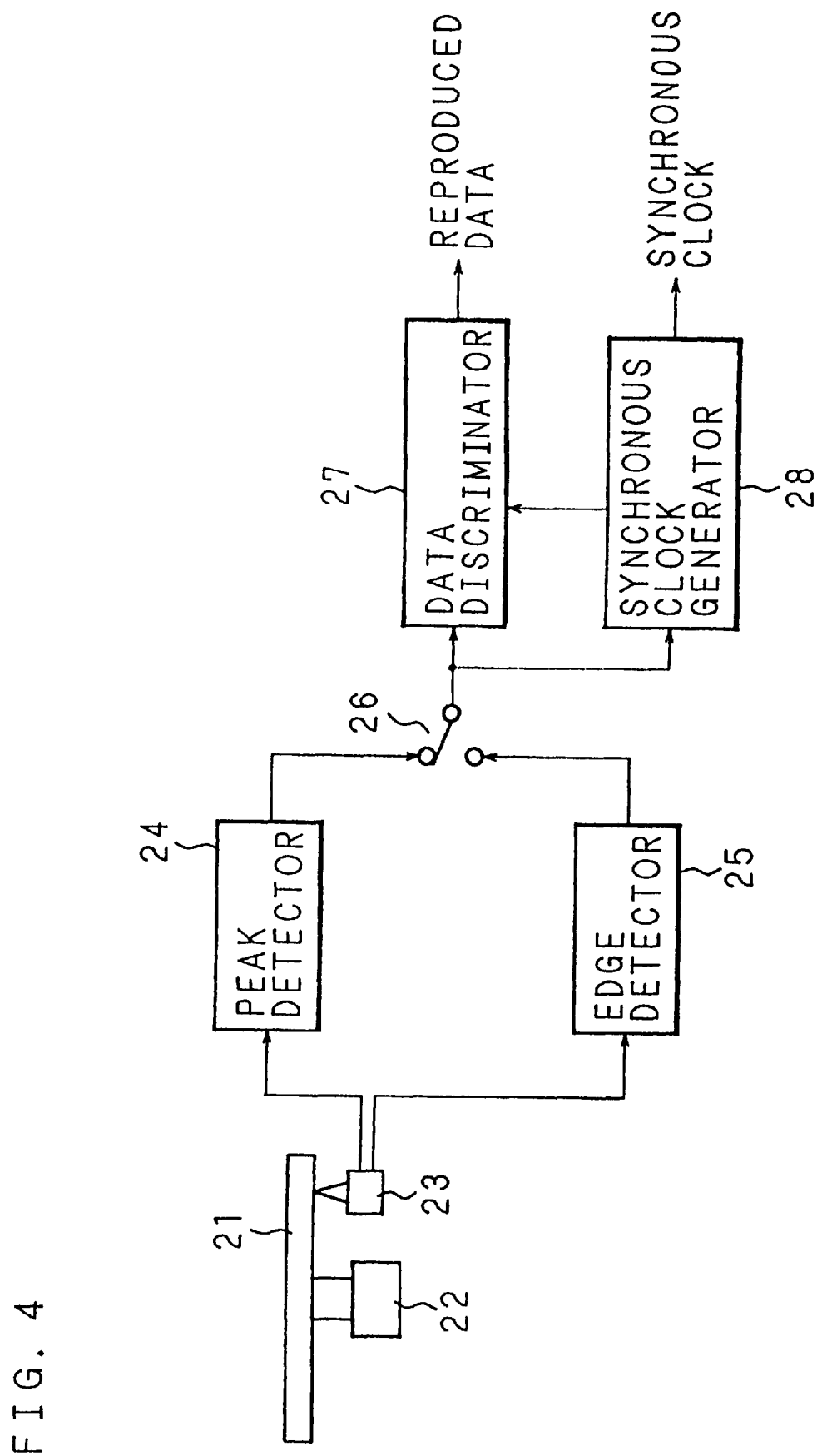
FIG. 4 is a block diagram showing the structure of a reproducing device for reproducing the high density magneto-optical medium of the invention.

FIG. 4 is a block diagram showing a configuration of a reproducing device for reproducing such a magneto-optical disk. In FIG. 4, reference numeral 21 denotes the magneto-optical disk of the invention on which data is recorded as described above. The magneto-optical disk 21 is driven to rotate by a spindle motor 22. Under the magneto-optical disk 21 is disposed a magneto-optical head 23 for reading data by irradiating the magneto-optical disk 21 with a laser beam. The magneto-optical head 23 outputs a magneto-optical reproduced waveform read from the magneto-optical recording area to a peak detector 24, and outputs a pre-formatted reproduced waveform read from the pre-formatted recording area to an edge detector 25.

The peak detector 24 detects a peak in the inputted reproduced waveform, and outputs a detection signal, via a switch 26, to a data discriminator 27 for discriminating the data recorded on the magneto-optical disk 21 and to a synchrorious clock generator 28 for generating a synchronous clock signal based on the inputted detection signal and outputting the synchronous clock signal to the data discriminator 26. The edge detector 25 detects an edge (the front or rear edge of a pit) in the reproduced waveform, and outputs a detection signal to the data discriminator 27 and the synchronous clock generator 28 via the switch 26.

The information recorded on the magneto-optical disk 21 is reproduced by using such a reproducing device as follows: The magneto-optical head 23 reads the magneto-optical reproduced waveform from the magneto-optical recording area, where the data is recorded by the position recording, and inputs the waveform to the peak detector 24 for detecting a peak. The magneto-optical head 23 also reads the pre-formatted reproduced waveform from the pre-formatted recording area, where the data is recorded by the edge recording, and inputs the waveform to the edge detector 25 for detecting an edge. A detection signal resulting from the detection of a peak or an edge is selected by the switch 26, and the selected detection signal is inputted to the data discriminator 27 and the synchronous clock generator 28. The synchronous clock generator 28 generates a synchronous clock signal in accordance with the inputted detection signal and outputs it to the data discriminator 27. The data discriminator 27 discriminates the data based on the detection signal in response to the synchronous clock signal and outputs the data to be reproduced. The switch 26 turns on, for example, the edge detector 25 first, and after reading ID data in the pre-formatted recording area, it turns on the peak detector 24.

Since the magneto-optical recording area and the pre-formatted recording area have the same linear recording density, the frequencies of the synchronous clock signals to be used for discriminating data from both of these areas are approximately sane. Therefore, only one set of the synchronous clock generator (PLL) 28 and the data discriminator 27 is required to reproduce both the data in the magneto-optical recording area and the pre-formatted recording area as shown in FIG. 4.

Figure 5:
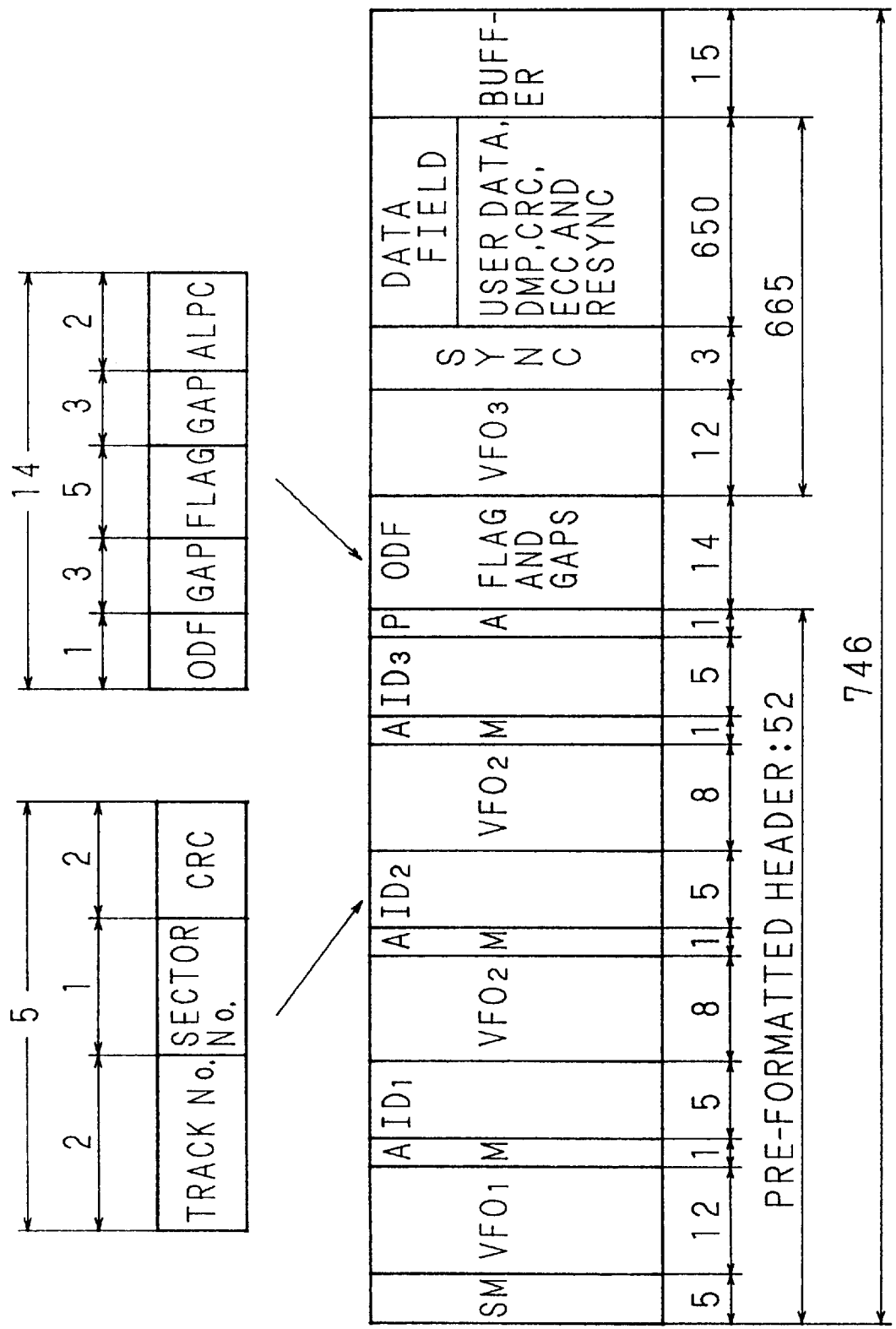
FIG. 5 shows the format of a 512-byte sector in a magneto-optical disk conforming to the ISO standard.

FIG. 5 shows the format in a 512-byte sector of a magneto-optical disk conforming to ISO/IEC 10089, and FIG. 6 shows the data pattern in a sector mark (SM) of the magneto-optical disk of FIG. 5. As shown in FIG. 6, the data is recorded by the edge recording in accordance with the length of the mark in the sector mark. When the above-mentioned reproducing device is used for such a magneto-optical disk conforming to ISO/IEC 10089 or ISO/IEC 10090, the edge detector 25 in FIG. 4 also works as an edge detector for detecting the sector mark recorded by the edge recording.

In the present invention, it is possible to allow the magneto-optical recording area and the pre-formatted recording area to have the same linear recording density in the MSR medium using the super resolution effect as described above. As a result, excellent reproducing characteristics can be obtained. Since the magneto-optical recording area and the pre-formatted recording area have the same linear recording density, a synchronous clock generator and a data discriminator can be used commonly to reproduce both the data in these two areas. As a result, the structure of the reproducing device can be simplified. Further, since the magneto-optical recording area and the pre-formatted recording area have the same linear recording density, a large ROM area is not required even when a huge amount of data is previously recorded in a ROM area. Therefore, a RAM area to be used by a user is not extremely small, and the magneto-optical medium of the invention is appropriate as a partial ROM disk or an application software disk.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A reproducing device for reproducing data from a magneto-optical medium including a magnetic layer having different magnetic characteristics depending upon temperature, comprising:

a peak detector for detecting a peak in a reproduced waveform in reproducing data from a magneto-optical recording area where said peak corresponds to one of "1" and "0" of the data;

an edge detector for detecting an edge in a reproducing waveform in reproducing data from a pre-formatted recording area where said edge corresponds to one of "1" and "0" of the data at substantially the same linear recording density as in said magneto-optical recording area;

a synchronous clock generator for generating a synchronous clock signal having substantially the same frequencies in reproducing the respective data in said magneto-optical recording area and said pre-formatted recording area; and a data discriminator commonly used to reproduce the data from said magneto-optical recording area and said pre-formatted recording area for discriminating the data on the basis of a respective output from said peak detector and said edge detector in response to the synchronous clock signal.

2. A reproducing device according to claim 1, wherein said edge detector also detects an edge of a sector mark in a magneto-optical medium conforming to the ISO standard.

* * * * *